United States Patent
Gustafsson et al.

(10) Patent No.: US 9,210,383 B2
(45) Date of Patent: Dec. 8, 2015

(54) CONDITIONAL ACCESS TO ENCRYPTED MEDIA CONTENT

(71) Applicant: Google Technology Holdings LLC, Montain View, CA (US)

(72) Inventors: Marcus Gustafsson, Linkoping (SE); Jonas Norling, Linkoping (SE); Daniel Wandemo, Linkoping (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/668,867

(22) Filed: Mar. 25, 2015

(65) Prior Publication Data

US 2015/0201163 A1 Jul. 16, 2015

Related U.S. Application Data

(63) Continuation of application No. 13/626,056, filed on Sep. 25, 2012, now abandoned.

(51) Int. Cl.
| | |
|---|---|
| *H04N 7/167* | (2011.01) |
| *H04N 21/254* | (2011.01) |
| *H04N 21/434* | (2011.01) |
| *H04N 21/4405* | (2011.01) |

(Continued)

(52) U.S. Cl.
CPC ............ *H04N 7/167* (2013.01); *H04L 63/0428* (2013.01); *H04N 7/1675* (2013.01); *H04N 21/2541* (2013.01); *H04N 21/434* (2013.01); *H04N 21/4405* (2013.01); *H04N 21/4623* (2013.01)

(58) Field of Classification Search
CPC ............ H04L 63/0428; H04L 63/0442; H04L 63/045; H04L 63/062; H04L 63/0823; H04L 63/04; H04L 63/12; H04L 63/123; H04L 63/08; H04L 63/126; H04L 63/104; H04L 2463/101; H04L 2209/60; H04N 7/1675; H04N 7/163; H04N 21/4405; H04N 21/2347; H04N 21/23476; H04N 21/2541; H04N 21/26606; H04N 21/4623; G06F 21/10
See application file for complete search history.

(56) References Cited

U.S. PATENT DOCUMENTS

| | | | |
|---|---|---|---|
| 5,949,876 A | 9/1999 | Ginter et al. | |
| 2001/0046299 A1* | 11/2001 | Wasilewski ...... | H04N 21/63345 380/282 |

(Continued)

OTHER PUBLICATIONS

Azgin, Aytac et aL., "A Unified Fast Channel Change Framework for IPTV Networks", The 8th Annual IEEE Consumer Communications and Networking Conference, 2011, two pages.

(Continued)

*Primary Examiner* — Eleni Shiferaw
*Assistant Examiner* — Gregory M Elmore
(74) *Attorney, Agent, or Firm* — Fenwick & West LLP (57) ABSTRACT

A method and apparatus for processing encrypted content distributed for end users in multiple services includes receiving entitlement information for a subset of at least two of the services separately from the encrypted content for the services and either calculating decryption key information for the subset of services from the entitlement information and storing the decryption key information in memory so that decryption key information for a selected service can subsequently be read from memory, or storing the entitlement information for the subset of services in memory so that the entitlement information for a selected service can subsequently be read from memory and decryption key information for the selected service can be calculated.

14 Claims, 6 Drawing Sheets

(51) Int. Cl.
*H04N 21/4623* (2011.01)
*H04L 29/06* (2006.01)

(56) References Cited

U.S. PATENT DOCUMENTS

| | | | | |
|---|---|---|---|---|
| 2006/0123246 A1* | 6/2006 | Vantalon | ................ | H04N 5/913 |
| | | | | 713/189 |
| 2007/0133797 A1* | 6/2007 | Schipper | ............ | G06Q 20/1235 |
| | | | | 380/231 |
| 2009/0089369 A1* | 4/2009 | Russ | .................. | H04N 21/8586 |
| | | | | 709/203 |
| 2009/0150673 A1* | 6/2009 | DeFreese | ............ | H04L 63/0428 |
| | | | | 713/170 |
| 2011/0238991 A1* | 9/2011 | Schipper | ................ | H04N 7/163 |
| | | | | 713/168 |

OTHER PUBLICATIONS

Digital Video Broadcasting (DVB), "Server-Based Fast Channel Change for DVB-IPTV Systems", DVB Document A152, Aug. 2010, twenty-three pages.

* cited by examiner

CONDITIONAL ACCESS TO ENCRYPTED MEDIA CONTENT

RELATED APPLICATIONS

This application is a continuation of U.S. patent application Ser. No. 13/626,056, filed on Sep. 25, 2012, which application is incorporated herein by reference.

BACKGROUND

The subject matter of this application relates to a method of providing conditional access to encrypted media content.

Audio/video media content (AV content), such as programming viewable on a TV appliance, may be broadcast using analog technology by modulating a radio frequency carrier that is propagated over a cable network. Different broadcast TV channels (commonly associated with channel names, such an NBC, CBS and FOX) are impressed on carriers at different frequencies. A receiver in the subscriber premises responds to a channel selection command by selecting the frequency of a desired channel for screening. The receiver may be integrated in the TV appliance or it may be included in a separate device, such as a set-top box (STB). AV content may also be distributed using digital cable technology. The cable network operator may distribute several services (corresponding to the channels of the analog broadcast television domain) by including content for multiple broadcast TV channels in one or more digital bitstreams that are impressed on the cable network at a network headend. A network operator may also distribute digital AV content over a wireless network (satellite or terrestrial). The network operator may also deliver the broadcast content using internet protocol TV (IPTV).

Moreover, pure audio content (i.e. content without a video component) may be broadcast over a cable network for screening using a suitable receiver. The term "screening" is used in this application to cover both listening to audio content and viewing and listening to AV content.

A content distributor that distributes media content over a cable network may wish to limit access to content distributed over the cable network. Limitations may be imposed at several levels. The content distributor may wish to prevent a subscriber who has terminated service from receiving content over a cable drop that extends to the subscriber premises and remains connected to the cable trunk. The content distributor will generally also wish to prevent a current subscriber from receiving access to a premium channel if the subscriber has elected not to pay the subscription fee for that channel. In addition, the content distributor will want to ensure that pay per view content is available only to subscribers who have in fact paid for access to that content. Access to content can be controlled by use of a conditional access system.

In a cable distribution network that employs conditional access on a channel by channel basis, the content for a channel or program to which access is to be limited may be encrypted as a function of a control word using a symmetric scrambling algorithm before being impressed on the cable distribution network.

The screening equipment uses a local decryption key that allows it to decrypt an ECM received with the content and recover the control word. Having recovered the control word, the screening equipment can decrypt the encrypted content and recover the original content for screening by the subscriber.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Disclosed herein are techniques for improving channel change latency. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

As described in more detail below, disclosed is a method of processing at a receiver encrypted content distributed to end users in multiple services by a transmitter, comprising receiving entitlement information for at least a subset of all the services separately from the encrypted content for the services, the subset comprising at least two services calculating decryption key information for the subset of services from the entitlement information, and storing the decryption key information in memory.

In an embodiment, the method may comprise processing at a receiver encrypted content distributed to end users in multiple services by a transmitter, comprising receiving entitlement information for at least a subset of all the services separately from the encrypted content for the services, the subset comprising at least two services, and storing the entitlement information for the subset of services in memory.

In an example embodiment is an apparatus for processing encrypted content distributed to end users in multiple services, comprising at least one receiver for receiving the encrypted content for at least a subset of all the services and for receiving entitlement information for at least the subset of services separately from the encrypted content for the services, a decryptor connected to receive the entitlement information and for calculating decryption key information for the subset of services from the entitlement information, and a memory connected to receive and store the decryption key information.

In an example embodiment is an apparatus for processing encrypted content distributed to end users in multiple services, comprising at least one receiver for receiving the encrypted content for at least a subset of all the services and for receiving entitlement information for at least the subset of services separately from the encrypted content for the services, and a memory connected to receive and store the entitlement information.

In an example embodiment is a method of distributing content in multiple services to end users and providing an end user with conditional access to a selected service, comprising encrypting the content for each service, impressing the encrypted content on a communication medium, and impressing entitlement information for all the services on the communication medium separately from the encrypted content, wherein a control word for decrypting the encrypted content for the selected service can be recovered from the entitlement information for the selected service.

Figure 1:
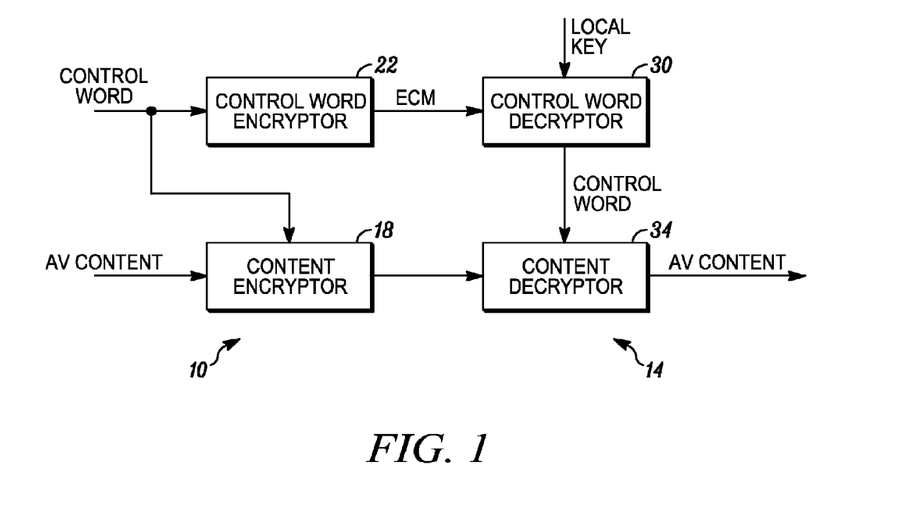
FIG. 1 is a block schematic diagram illustrating in simplified form how conditional access may be applied to limit access to AV content.

FIG. 1 illustrates in simplified form the principal functions of a conditional access (CA) system that might be used to limit access to AV content distributed over a cable distribution network. It will, however, be appreciated that the disclosed subject matter is not limited to a cable distribution network and is applicable to other networks, such as wireless (satellite and terrestrial) and IP networks. For purposes of the description of FIG. 1, we are ignoring both encoding of the AV content for compression and multiplexing of the AV content for distribution.

The conditional access (CA) system shown in FIG. 1 includes a headend unit 10 and a subscriber unit 14. The headend unit is located at the headend of a cable distribution network comprising a trunk and cable drops branching from the trunk and terminating at subscriber premises. The subscriber CA unit 14 is located at a subscriber premises.

AV content that is received at the headend for distribution over the cable network is encrypted by a content encryptor 18 in the headend CA unit 10 using a control word. The encrypted AV content is delivered over the cable network to the subscriber CA unit 14. The headend CA unit also includes a control word encryptor 22, which encrypts the control word and generates an entitlement control message (ECM). The control word may change quite frequently. The ECM is multiplexed with the encrypted AV content and is delivered to the subscriber CA unit 14 over the cable network in-band with the encrypted AV content.

A control word decryptor 30 in the subscriber CA unit receives the ECM from the headend CA unit and recovers the control word by decrypting the ECM using a local decryption key. There are several techniques for providing the local decryption key. One such technique employs an entitlement management message (EMM) stored in the subscriber CA unit. A content decryptor 34 decrypts the encrypted AV content using the control word.

Figure 2A:
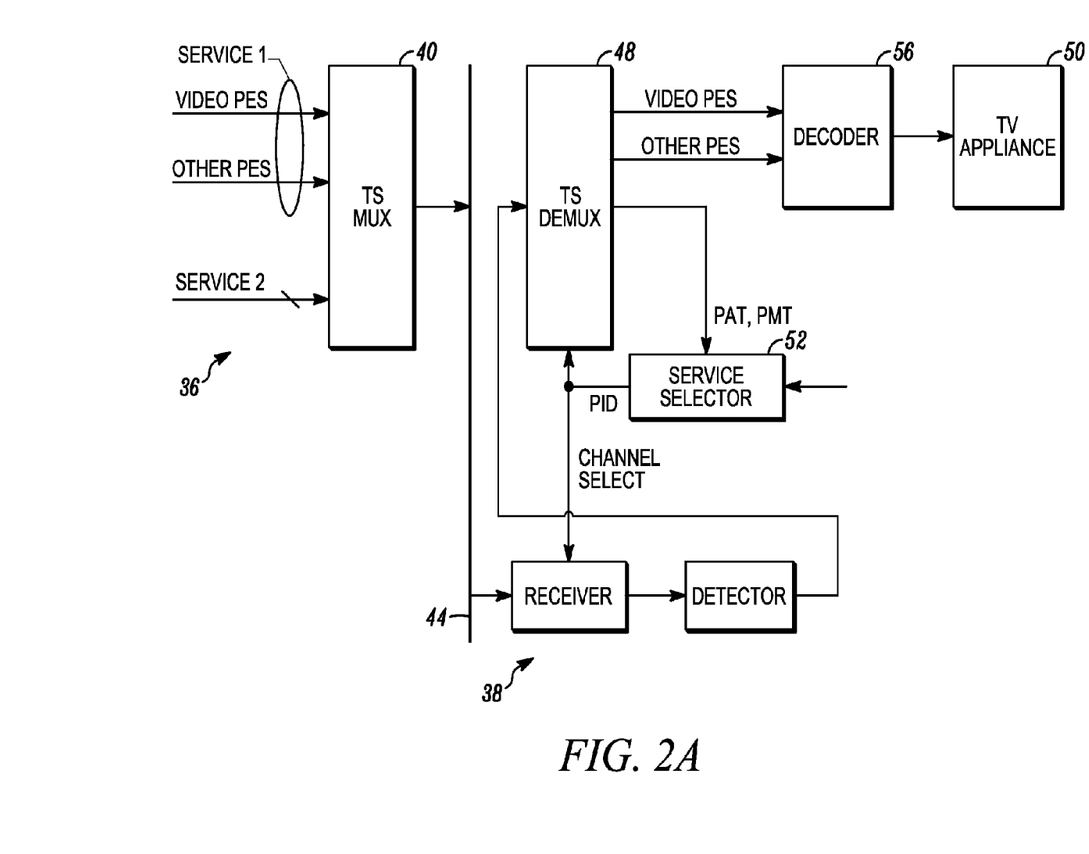
FIG. 2A is a block schematic diagram illustrating how headend equipment and subscriber premises equipment are connected to a cable distribution network.

FIG. 2A illustrates schematically how multiple programs may be distributed to multiple subscribers.

FIG. 2A illustrates headend equipment 36 and subscriber premises equipment 38 connected to a content distribution network 44. The network is illustrated schematically as a cable network but it will be understood that it could alternatively be a wireless network or an IP network.

The AV content of a TV channel may be received at the headend equipment 36 as a video packetized elementary stream (PES) conveying the video content of the channel and additional PESs, such as one or more audio PESs and a subtitle PES. The aggregation of content and data associated with the TV channel may be referred to as a service. Each PES is composed of a sequence of variable-length packets each having a header and payload. A transport stream multiplexer 40 receives the packetized elementary streams, assigns a packet identifier (PID) to each PES, and organizes each PES packet as one or more fixed-length MPEG-2 transport stream (TS) packets. Each TS packet derived from a given PES packet has a header that includes the PID of the PES and a payload containing at least a portion of the payload of the PES packet. The transport stream also includes a program map table (PMT), which is a TS packet that contains the PIDs for each of the elementary streams of the service, and a program association table (PAT), which is a transport stream packet that contains the PIDs that identify the PMTs of the different services, and may include program specific information (PSI) carrying signalling tables.

In general, the TS multiplexer also receives PESs for at least one other service and outputs a multi-program transport stream (MPTS) conveying multiple services.

The TS multiplexer 40 outputs a bitstream that modulates a carrier at the center frequency of one of the frequency channels and a transmitter (not shown) applies the modulated carrier to the cable network 44.

A cable network might have a frequency span of 200 MHz and be able to support 25 channels. Each channel conveys one transport stream, which may be a single program transport stream (SPTS) or an MPTS depending on the bitrate requirements of the service or services carried by the transport stream.

The front end of the subscriber equipment includes a tunable receiver that is tuned to one of the frequency channels and a detector that recovers the bitstream from the modulated carrier in the selected channel and supplies the bitstream to a TS demultiplexer 48. Let us assume that the receiver is tuned to the frequency channel that conveys the MPTS carrying services 1 and 2.

In order to screen the programming of service 1 on a TV appliance 50, the subscriber employs a remote control unit to issue a service select signal, which is applied to a service selector 52. The service selector stores a database that relates each service to the frequency channel that conveys the transport stream carrying the service. The service selector receives the PAT and PMT packets for the different services included in the MPTS from the transport stream demultiplexer 48, identifies the PMT of the service corresponding to the selected service on the basis of the PAT packets, recovers the PIDs for the selected service from the identified PMT, and latches the PIDs for the selected service into a register (not separately shown) associated with the demultiplexer 48. The demultiplexer 48 selects the TS packets having PIDs that match the PIDs stored in the register from the MPTS and thereby separates the selected service from the MPTS, recreates the PESs from the selected TS packets, and provides the PESs for the selected service to a decoder 56. The decoder generates an AV signal that is compatible with the TV appliance 50.

When the subscriber wishes to screen the programming of service 2, the program selector recovers the PIDs for service 2 and updates the content of the demultiplexer register. The demultiplexer 48 selects the TS packets having PIDs that match the PIDS of the new service and recreates the PESs of service 2.

In the event that the subscriber wishes to screen the programming of a service that is carried by a different transport stream, the service selector issues a signal to the receiver that identifies the channel conveying that transport stream and the receiver tunes to that channel.

Figure 2B:
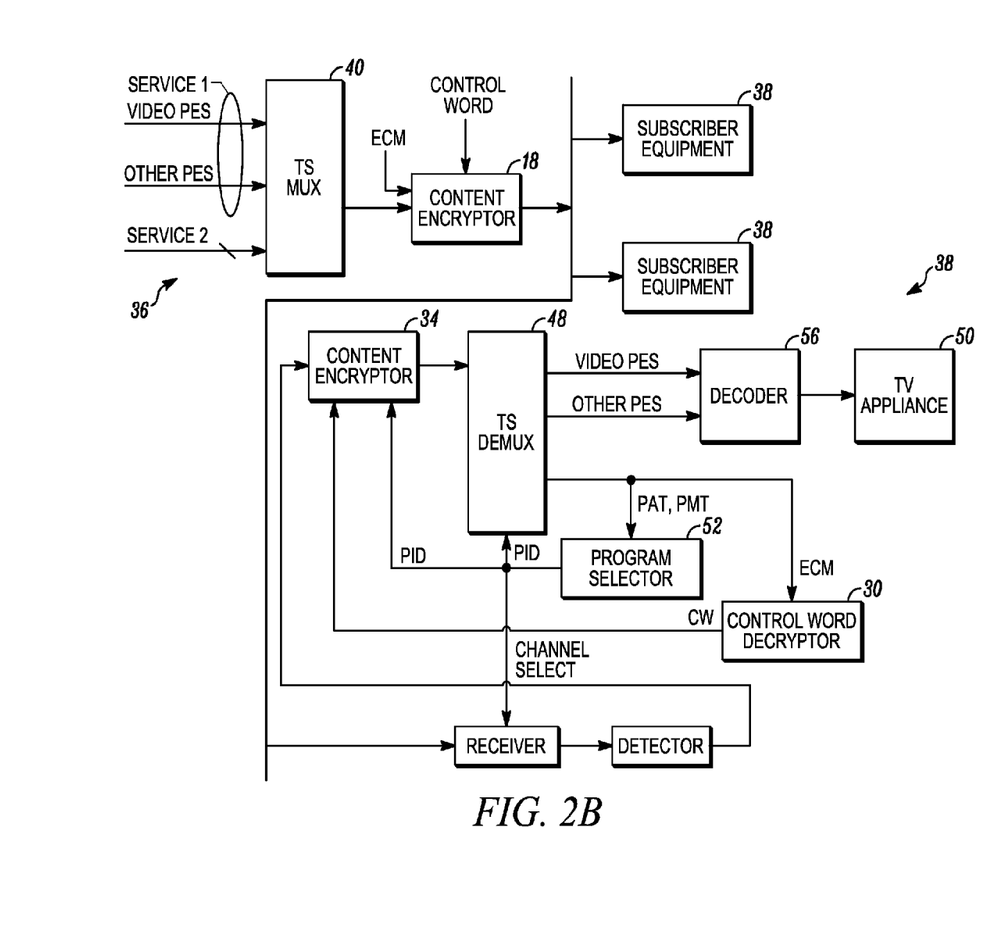
FIG. 2B is a block schematic diagram similar to FIG. 2A but illustrating application of conditional access to the headend equipment and the subscriber premises equipment.

FIG. 2B illustrates a modification of the general topology shown in FIG. 2A. The system shown in FIG. 2B allows implementation of conditional access and includes a headend CA unit and a subscriber CA unit. The subscriber premises equipment 38 (other than the TV appliance 50) may be included in a set-top box (STB). The STB includes an integrated receiver and decoder (IRD) incorporating the subscriber CA unit.

In the distribution system shown in FIG. 2B, the content encryptor 18 receives the TS packets produced by the TS multiplexer and uses the control word to encrypt the payload of the TS packets that convey the AV content. The headend CA unit does not encrypt the PSI, the PAT packet or the PMT packet, or the headers of the TS packets that convey the AV content. The content encryptor also receives the ECM and adds the TS packets containing the ECM to the transport stream multiplex. Thus, the ECM is conveyed in-band with the AV content that is encrypted by the corresponding control word, in the same transport stream.

The content decryptor 34 is transparent to the PSI, and to the PAT packets, the PMT packets and the ECM packets. As in the case of FIG. 2A, the program selector 52 may receive the PAT and PMT packets for the different services included in the MPTS from the transport stream demultiplexer 48, identify the PMT of the service corresponding to the currently-selected channel on the basis of the PAT packets, recover the PIDs for the current service from the identified PMT, and latch the PIDs for the current service into a register associated with the demultiplexer 48. The TS demultiplexer 48 may also latch the ECM for the current service into a register associated with the control word decryptor 30, which may recover the control word from the ECM and supply the control word to the content decryptor 34. The program selector may provide the content decryptor 34 with the PIDs for the TS packets that convey the AV content of the current service. The content decryptor can decrypt the payload of the TS packets that convey the AV content of the current service and pass the TS packets containing decrypted AV content to the transport stream demultiplexer 48.

Each time the ECM changes, the control word decryptor calculates the new control word and supplies it to the content decryptor.

In the event that the subscriber wishes to screen programming of a service conveyed by another transport stream, and accordingly causes the program selector 52 to select a different channel, the subscriber cannot screen the AV content of the service conveyed by the newly-selected transport stream until the TS demultiplexer 48 has provided the ECM for the new transport stream to the control word decryptor 34 and the control word decryptor has decrypted the ECM for the new transport stream and has recovered the control word. Tests have shown that this may take as long as several hundred milliseconds. Subscribers to programming provided by cable distribution networks are intolerant of what they perceive to be unreasonable latency in a channel change operation.

Several approaches for improving channel tune time have been proposed, but such approaches may involve substantial increase in bandwidth load on the network and moreover do not address the problem of the need to calculate the control word in order to commence decrypting the AV content of the new service.

Figure 3:
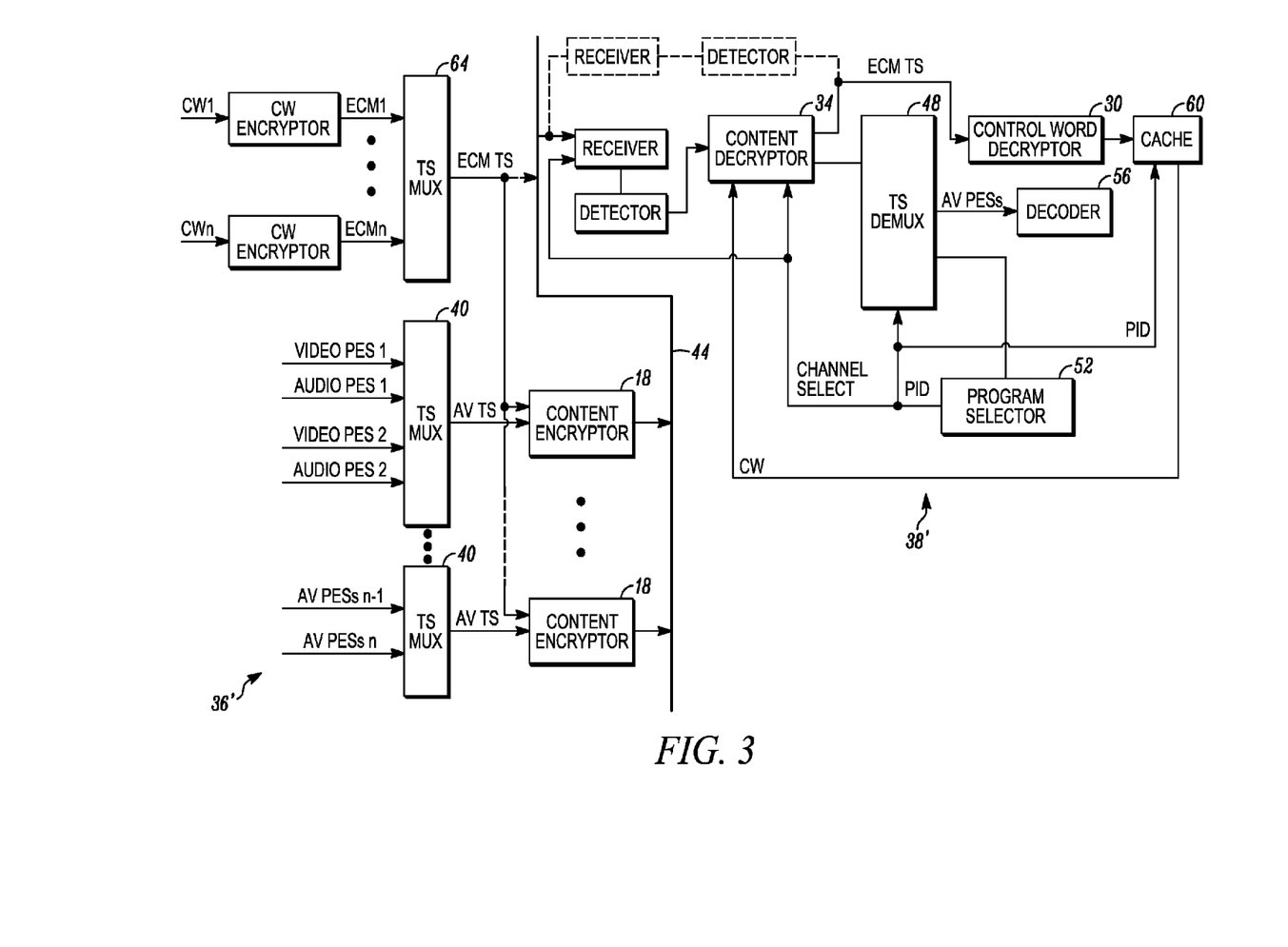
FIG. 3 is a block schematic diagram illustrating a modification of the system shown in FIG. 2B.

Referring to FIG. 3, the channel tune time may be reduced if the ECMs for all encrypted channels are aggregated into a separate transport stream having its own PID and which is multiplexed into each transport stream conveying one or more AV services. FIG. 3 illustrates multiple TS multiplexers 40 each providing an AV transport stream conveying two services. For example, there may be five AV transport streams conveying ten services. A separate transport stream multiplexer 64 receives the ECMs for all five transport streams and generates a separate ECM transport stream. The content encryptor 18 adds the TS packets of the ECM transport stream to each of the AV transport streams. The ECM transport stream has a very low bitrate and therefore does not add significantly to the bitrate requirement of the AV transport streams. The five transport streams, each containing both AV content for two services and ECM packets for all five multiplexes, are transmitted in respective frequency channels. At the subscriber premises, the receiver is tuned to one of five frequency channels and the detector provide a bitstream conveying the AV content and the ECMs to the content decryptor. The TS demultiplexer separates the ECM transport stream from the AV content and supplies the ECM transport stream to the control word decryptor 30. The control word decryptor calculates the control words for all the encrypted channels and stores the PID for each encrypted channel and the corresponding control word in a cache 60. Each time an ECM changes, the control word decryptor updates the contents of the cache with the new control word.

When the subscriber wishes to change services, e.g. from service 1 to service n, the program selector 52 provides the PID for the newly-selected service to the cache and reads the corresponding control word from the cache and provides it to the content decryptor 34. Thus, the control word is immediately available, without its being necessary for the TS demultiplexer to provide the ECM for the newly selected channel to the control word decryptor and for the control word decryptor to decrypt the ECM for the new service.

In general, the aggregation of the ECMs into the ECM transport stream will take place at the headend of the cable distribution network, but depending on the nature of the system of which the distribution network forms a part, the aggregation may take place elsewhere.

An IRD, for example, can then use the aggregated information to calculate encryption keys in advance for each channel available in the aggregated stream, as described herein, or just store the info needed for key calculation. When a particular channel is requested, the aggregated information may be used to setup the decoders and decryption engines with the calculated encryption keys before extracting the information from the actual channel stream. The use of such sideband signalling instead of in-band signalling may make it possible to receive information in advance instead of receiving all channel streams at once. In an example embodiment, ECMs may be aggregated and made available to the STB before the tune. The STB can cache all such ECMs, pre-calculate and cache the keys for all channels, such that the keys are ready to be used at the start of any given channel change. This eliminates the latency caused by the STB having to receive the ECMs inline with the channel tune. Thus, the time required for the STB to receive an ECM and calculate decryption keys is added at the front end to the total tune time. If the ECMs can be delivered in advance, and the decryption keys can be pre-calculated and cached, then the channel acquisition can proceed more quickly, without having to wait for ECM reception and key derivation. An increase of 100 ms-300 ms, for example, may be experienced. For tuner based reception, where a decode buffer before the demuxer may not be supported, the channel change time can thus be reduced using the techniques disclosed herein.

In a modification that is illustrated by a dashed line connection in FIG. 3, illustrating an embodiment in which the IRD may include at least two receivers and at least two detectors, the content encryptor 18 does not add the ECM transport stream packets to the AV transport streams. Instead, the ECM transport stream is broadcast separately from the AV transport streams. At the subscriber premises, the ECMs are recovered from the ECM transport stream packets and are decrypted and stored in the cache 60. The ECM transport stream may be broadcast in a different frequency channel from the AV transport streams. Alternatively, an out of band modulation technique may be used to broadcast the ECM transport stream in the same frequency bands as the AV transport streams. Gathering this information via sideband channelling enables the IRD to filter information from the channel stream for decyprting and decoding without having to wait for the setup information needed, enabling the IRD to present the channel stream faster. An additional receiver and an additional detector (shown in dashed lines in FIG. 3) may be used to implement this modification.

Figure 4:
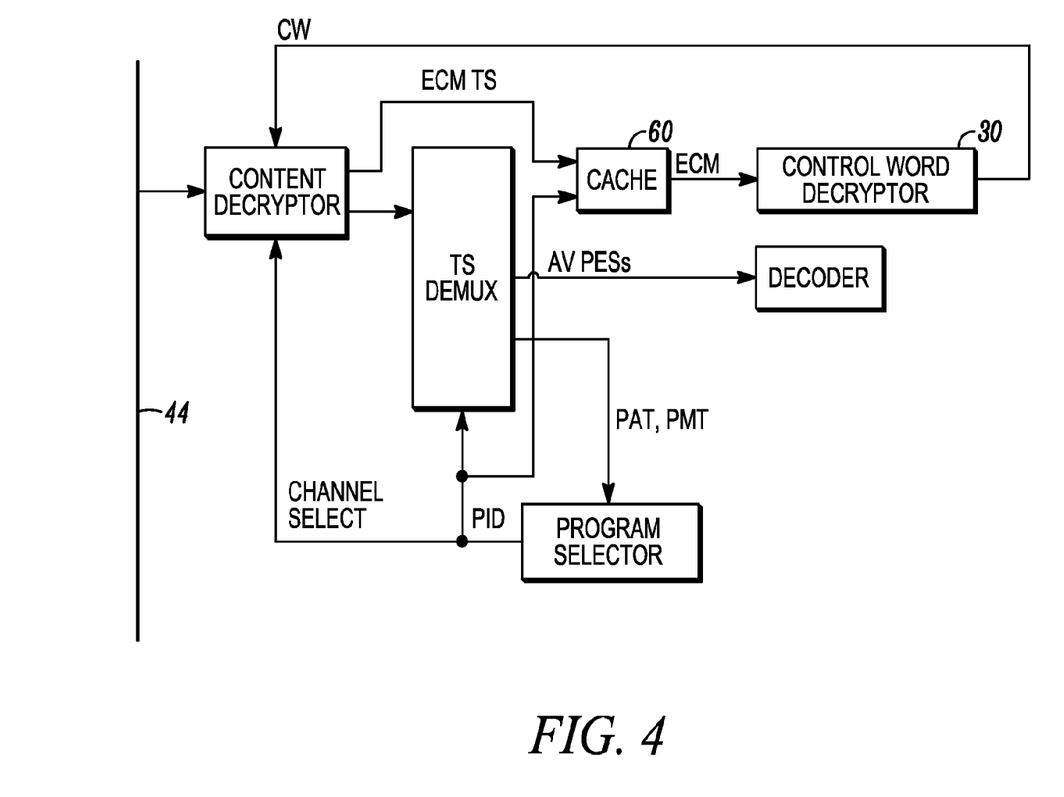
FIG. 4 is a block schematic diagram illustrating a modification of the system shown in FIG. 3.

Referring to FIG. 4, in a modification of the system described with reference to FIG. 3 the control word decryptor does not calculate the control words in advance. The cache stores the PID for each encrypted channel and the corresponding ECM, and when the subscriber wishes to change channels, the program selector 52 reads the ECM for the newly-selected service from the cache and supplies it to the control word decryptor, which provides the corresponding control word to the content decryptor 34. Although the control word is not calculated in advance, channel change latency is nevertheless reduced relative to the system described with reference to FIG. 2B because the ECM is immediately available.

A modification similar to that discussed in connection with FIG. 3, in which the ECM transport stream is broadcast separately from the AV transport streams, is applicable to FIG. 4. In this modification, the ECM transport stream is received separately from the selected AV transport stream and the ECMs are recovered from the ECM transport stream and are stored in the cache 60 to be decrypted when the subscriber changes services.

It will be appreciated that in a conventional implementation of conditional access, the ECM data may be repeated several times a second even though the interval between changes in the ECM data may range from five seconds to ten minutes, in order to avoid any delay in presentation of a newly selected service. In accordance with the subject matter described with reference to FIGS. 3 and 4, the ECMs for all services are constantly monitored and are updated when changed and so it is not necessary for the ECM transport stream to contain any repetitions. Accordingly, the bitrate of the ECM transport stream can be very low and providing the separate ECM transport stream does not add significantly to the bandwidth load on the network.

It will be appreciated that in an IPTV network, the different transport streams are not allocated to different frequency channels but to different IP multicast addresses. Instead of tuning to a frequency channel in order to select a service conveyed by a transport stream, the subscriber equipment selects the IP multicast address associated with the transport stream.

Figure 5:
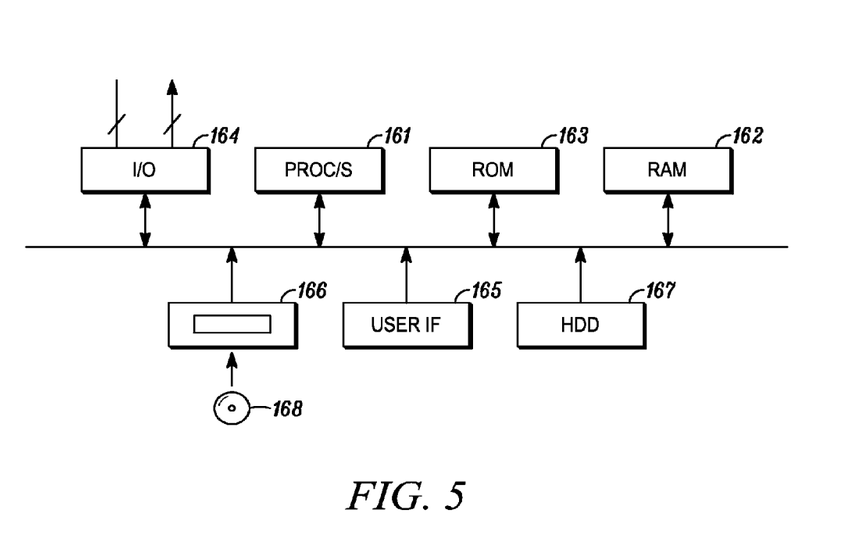
FIG. 5 is a block schematic diagram of a computing machine that may be used to implement parts of the processes described with reference to FIGS. 3 and 4.

It will be appreciated by those skilled in the art that although the functional blocks shown in the drawings might be considered to be illustrated as hardware blocks, several of the functional blocks may be implemented using software. Thus, referring to FIG. 5, the functions described above of the headend equipment and/or the subscriber premises equipment may be partially or wholly implemented using a computer comprising at least one processor 161, random access memory 162, read only memory 163, I/O devices 164 (including suitable adaptors for receiving and transmitting bitstreams), a user interface 165, a CD ROM drive 166, a hard disk drive 167 and one or more buses, configured in a generally conventional architecture. The computer operates in accordance with a program that is stored in a non-transitory computer readable medium, such as the hard disk drive 167 or a CD-ROM 168, and is loaded into the random access memory 162 for execution. The program is composed of instructions such that when the computer receives a signal representing the input of the headend equipment or the subscriber premises equipment, by way of a suitable interface included in the I/O devices 164, the computer allocates memory to appropriate buffers and utilizes other suitable resources and functions to perform the various operations that are described above as being performed by the headend equipment or the subscriber premises equipment. In a particular implementation of the subscriber premises equipment, the program selector might be implemented by a host processor that runs a program allowing it to identify the PIDs of interest whereas the content decryptor might be implemented by an access control processor that filters on the identified PIDs and decrypts the payload according to the control word provided by an external agent (such as a smart card).

It will be appreciated by those skilled in the art that the program might not be loadable directly from the CD-ROM 168 into the random access memory utilizing the CD-ROM drive 166 and that generally the program will be stored on the CD-ROM or other distribution medium in a form that requires the program to be installed on the hard disk drive 167 from the CD-ROM 168.

It will be appreciated that the invention is not restricted to the particular embodiments that have been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. For example, although entitlement information for all the encrypted services is impressed on the distribution network, a given subscriber may not be able to receive, in the sense of being able to act on, the entitlement information for all the encrypted services. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A computer-implemented method of storing decryption key information, the method comprising:
receiving entitlement control information for at least a subset of services, the subset of services including at least two services, the entitlement control information received in transport stream packets;
receiving encrypted content for at least the subset of services separately from the entitlement control information, the encrypted content received in transport stream packets having a packet identifier different from packet identifiers associated with the entitlement control information;
calculating, in advance of receiving a service change request, decryption key information for the subset of services from the entitlement control information;
storing the decryption key information in machine memory;
receiving the service change request, the service change request identifying a selected service of the subset of services;

responding to the service change request by reading decryption key information for the selected service from the machine memory; and employing the selected decryption key information to decrypt the encrypted content for the selected service.

2. The computer-implemented method of claim 1, wherein calculating the decryption key information comprises using a local decryption key.

3. The computer-implemented method of claim 1, further comprising:

detecting a change in the entitlement control information;

responsive to detecting the change in the entitlement control information, recalculating the decryption key information; and storing the recalculated decryption key information in the machine memory.

4. The computer-implemented method of claim 1, wherein the entitlement control information is received at a transport stream demultiplexer.

5. An apparatus for storing decryption key information, the apparatus comprising:

at least one receiver for receiving encrypted content for at least a subset of services and for receiving entitlement control information for the subset of services separately from the encrypted content for the services, the subset of services including at least two services;

a decryptor configured to receive the entitlement control information and for calculating, in advance of a content decryptor receiving a selected service, decryption key information for the subset of services from the entitlement control information;

the content decryptor configured to receive the selected service of encrypted content and decryption key information associated with the selected service and operative to employ the decryption key information to decrypt the encrypted content of the selected service;

a transport stream demultiplexer for separating a transport stream conveying the entitlement control information from a transport stream conveying the encrypted content based on packet identifiers and providing transport stream packets conveying the entitlement control information to the decryptor; and a memory configured to receive and store the decryption key information.

6. The apparatus of claim 5, wherein the decryptor calculates the decryption key information using a local decryption key.

7. The apparatus of claim 5, wherein:

the decryptor is further configured to:

detect a change in the entitlement control information, and responsive to detecting the change in the entitlement control information, recalculate the decryption key information; and the memory is further configured to receive and store the recalculated decryption key information.

8. An apparatus for storing entitlement control information, the apparatus comprising:

at least one receiver for receiving encrypted content for at least a subset of services and for receiving entitlement control information for the subset of services separately from the encrypted content for the services, the subset of services including at least two services;

a memory configured to receive and store the entitlement control information;

a decryptor configured to read the stored entitlement control information associated with a selected service from the memory and, in advance of receiving a service change request, calculate decryption key information for the selected service from the entitlement control information; and a computer program storing instructions for:

receiving the service change request, the service change request identifying a selected service of the subset of services;

responding to the service change request by selecting the calculated decryption key information for the selected service;

employing the selected decryption key information to decrypt a control word; and employing the control word to decrypt the encrypted content for the selected service.

9. The apparatus of claim 8, wherein the decryptor calculates the decryption key information using a local decryption key.

10. The apparatus of claim 8, wherein:

the decryptor is further configured to:

detect a change in the entitlement control information associated with the selected service from the memory, and responsive to detecting the in the entitlement control information, recalculate the decryption key information for the selected service from the entitlement control information; and the computer program further storing instructions for responding to the service change request by selecting the recalculated decryption key information for the selected service.

11. A non-transitory computer-readable medium storing a computer program composed of instructions comprising:

instructions for receiving entitlement control information for at least a subset of services, the subset of services including at least two services, the entitlement control information received in transport stream packets;

instructions for receiving encrypted content for at least the subset of services separately from the entitlement control information, the encrypted content received in transport stream packets having a packet identifier different from packet identifiers associated with the entitlement control information;

instructions for calculating, in advance of receiving a service change request, decryption key information for the subset of services from the entitlement control information;

instructions for storing the decryption key information in machine memory;

instructions for receiving the service change request, the service change request identifying a selected service of the subset of services;

instructions for responding to the service change request by reading decryption key information for the selected service from the machine memory; and instructions for employing the selected decryption key information to decrypt the encrypted content for the selected service.

12. The non-transitory computer-readable medium of claim 11, the instructions for calculating decryption key information further comprising using a local decryption key.

13. The non-transitory computer-readable medium of claim 11, the instructions further comprising:

instructions for detecting a change in the entitlement control information;

the instructions for calculating decryption key information further comprising recalculating decryption key information responsive to detecting the change in the entitlement control information;

the instructions for storing the decryption key information further comprising storing the recalculated decryption key information; and the instructions for responding to the service change request further comprising reading the recalculated decryption key information for the selected service from the machine memory.

14. The non-transitory computer-readable medium of claim 11, wherein the entitlement control information is received at a transport stream demultiplexer.

* * * * *